Nov. 19, 1935.  S. URYTZKY  2,021,531
TOY VEHICLE
Filed Feb. 28, 1935  2 Sheets-Sheet 1
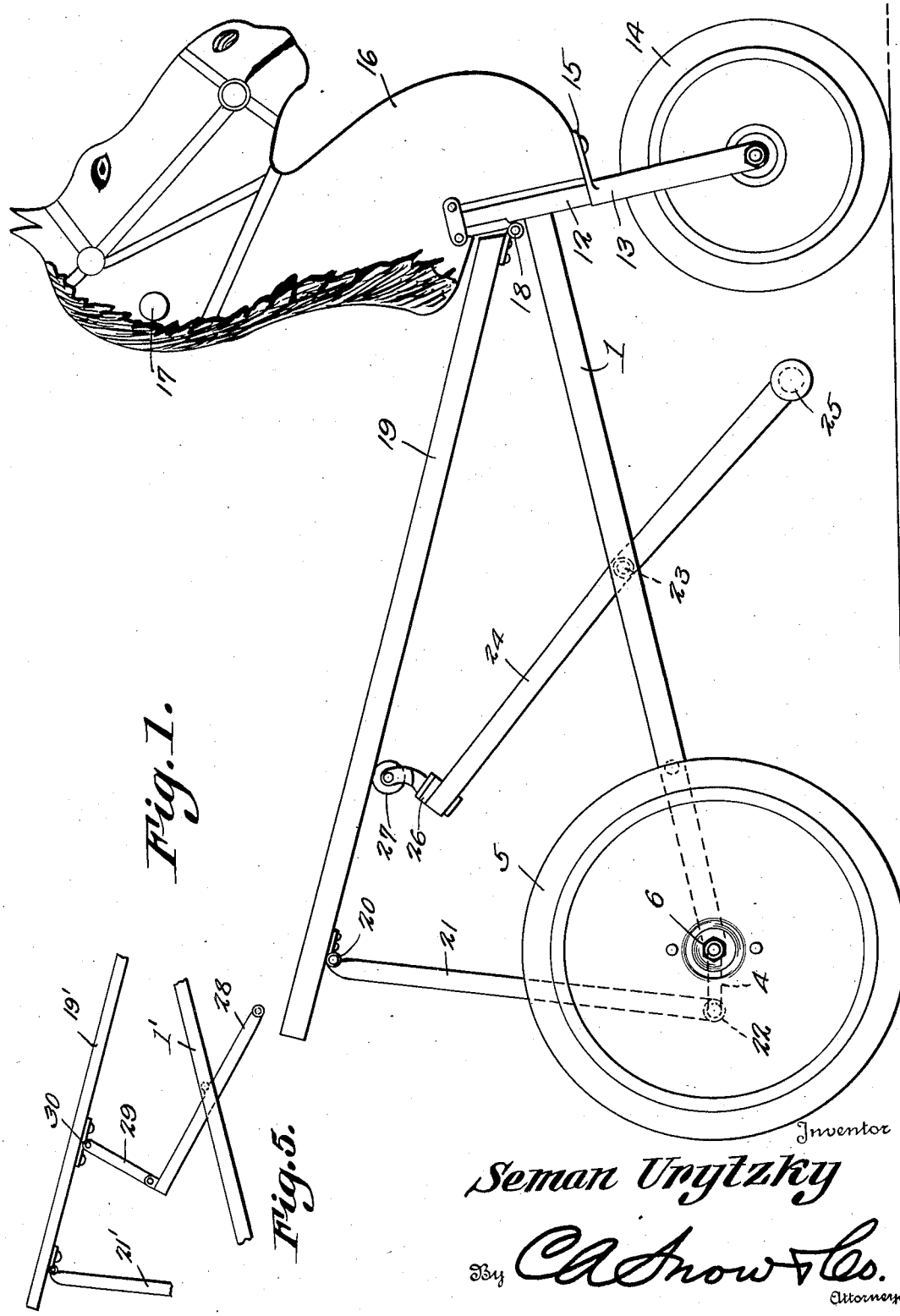
Inventor
Seman Urytzky
By C.A. Snow & Co.
Attorneys.

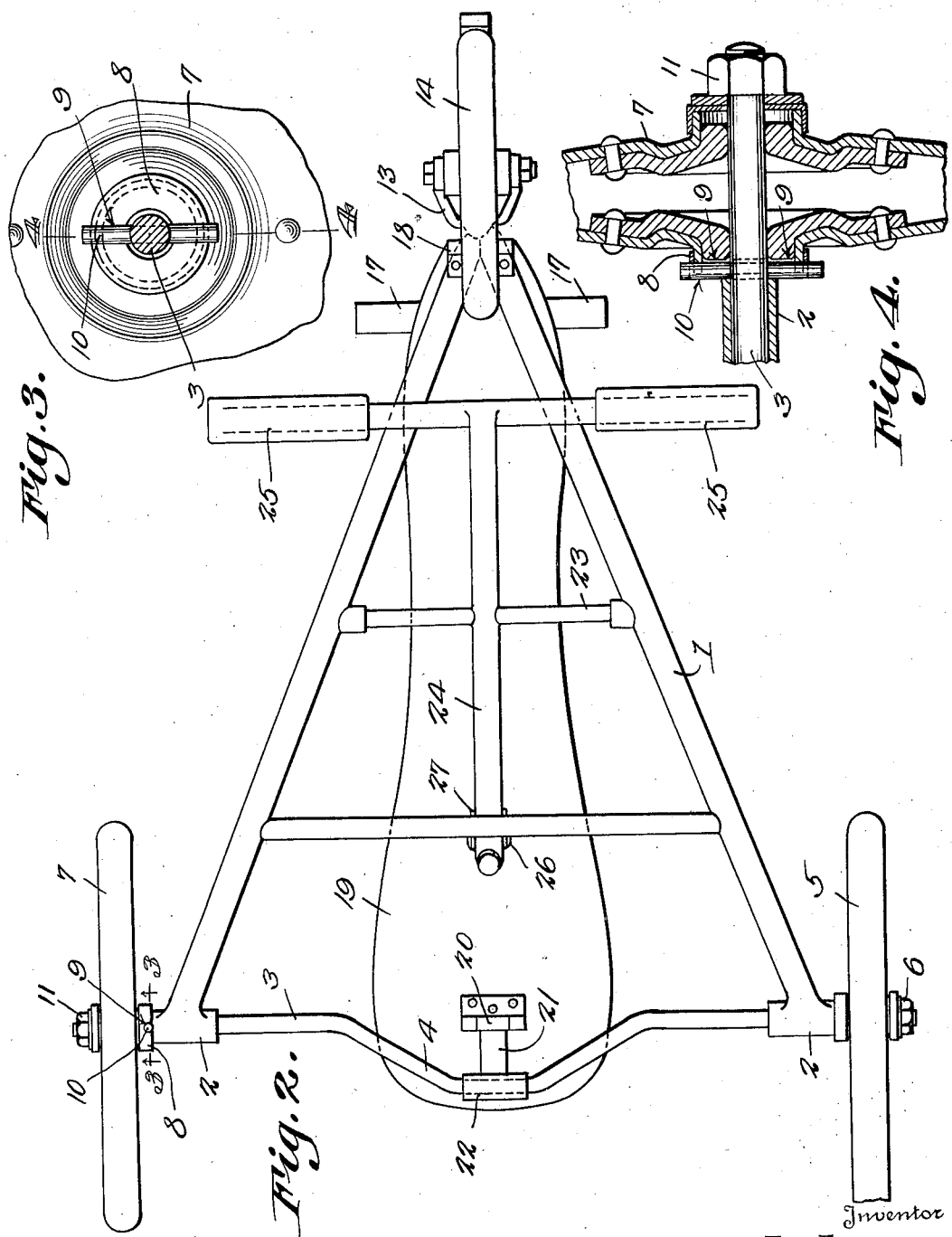

Patented Nov. 19, 1935

2,021,531

UNITED STATES PATENT OFFICE 2,021,531

TOY VEHICLE

Seman Urytzky, Piscataway, N. J., assignor of one-half to William H. Kelsey, New Brunswick, N. J.

Application February 28, 1935, Serial No. 8,765

5 Claims. (Cl. 208—38)

This invention relates to a toy vehicle designed primarily for use by children for the purpose not only of providing transportation but also for exercising muscles.

It is an object of the invention to provide a vehicle the seat portion of which is mounted for up and down motion and serves as a means for transmitting power from foot pedals to the rear supporting wheels so that every time the rider straightens the legs to bear down upon the pedals, the seat will rise and power will be applied in an upward direction to the axle of the wheels after which, when the legs are bent and the weight of the body applied directly to the seat, the propulsion of the wheels will be continued by the downward application of power to the wheel axle.

A still further object is to provide simple and efficient means for connecting the driving wheel to the axle.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 1 is a side elevation of the vehicle.

Figure 2 is a bottom plan view thereof.

Figure 3 is an enlarged section on line 3—3, Figure 2.

Figure 4 is a section on line 4—4, Figure 3.

Figure 5 is a side elevation on a reduced scale of a portion of the vehicle showing a modified mechanism.

Referring to the figures by characters of reference, 1 designates the frame of the vehicle which can be A-shaped with diverging sides connected by cross members and the rear end of the frame is provided with spaced bearing sleeves 2 in which is journalled a driving axle 3 having an intermediate crank 4. A supporting wheel 5 is mounted to rotate freely on one end portion of this axle where it is held by a nut 6 or the like. On the other end of the axle is mounted a driving wheel 7 similar to the wheel 5 but provided, at the inner end of its hub 8 with diametrically opposed notches 9. A coupling pin 10 which can be of any preferred construction is extended through the axle 3 between the wheel 7 and the adjacent sleeve 2 and is seated in the notches 9, thereby securely coupling wheel 7 to the axle so that when the axle is rotated power will be transmitted to the wheel. This wheel is held to the axle by a nut 11 or the like.

The front or apex end of the frame 1 has a shank 12 rigidly connected thereto and inclined preferably downwardly and forwardly at right angles to the downwardly and rearwardly inclined frame 1. On the lower end of this shank is mounted a fork 13 carrying a front or steering wheel 14 and projecting from the upper portion of the fork is an ear 15 to which is secured a support 16 for the handle bars 17. This support and the fork thus cooperate to constitute a steering head.

This support can be of any desired configuration and in the structure illustrated is in the form of the neck and head of a horse with the ends of the bar 17 extending in opposite directions therefrom. The upper end of shank 12 is seated in this support 16 so that the support, with fork 13 and wheel 14 are thus free to swing about shank 12 as an axis.

Hingedly connected at 18 to the upper end portion of shank 12 and close to the front end of frame 1 is an elongated seat 19 which can be in the form of a suitably shaped board and hingedly connected to the bottom of this seat near its rear end as shown at 20 is a pitman 21 the lower end of which has a sleeve 22 mounted on the crank 4.

A cross bar 23 is carried by frame 1 and mounted to swing thereon is a pedal lever 24 the lower end of which has oppositely extending arms 25 projecting beyond the sides of the frame 1 and seat 19. This lever is adapted to swing within frame 1 and its rear end has a bracket 26 in which is journaled a roller 27 having rolling contact with the bottom of seat 19 at a point in front of the hinge 20.

When the user of the vehicle mounts the seat 19 the weight of the body will be transmitted through pitman 21 to crank 4 which will thus be thrust downwardly to a depending position from the position shown in Figure 1. At the same time roller 27 will thrust downwardly on lever 24 and move the pedals 25 upwardly to their highest position. The user then grasps the handle bars 17 for the purpose of steering the vehicle and then presses downwardly on pedals 25 at the same time straightening the legs and lifting the weight of the body off of seat 19 so that the roller 27 will travel forwardly and cause the seat to go upwardly while the pedals are going downwardly. This will impart a one-half rotation to axle 3 and wheel 7. When the pedals reach the lowest limit of their movement the rider reverses the action by transferring the weight of the body to seat 19 and moving it from the pedals 25. Thus seat 19 will thrust downwardly through pitman 21 upon the crank 4 and complete the rotation of the axle through 360°. The foregoing operations are then repeated and the vehicle will of course travel forwardly or rearwardly as preferred, it being guided by means of the handle bars 17 and wheel 14.

Importance is attached to the simple means whereby wheel 7 is connected to axle 3. This connection will in no way interfere with the quick removal of the wheel from the axle when desired.

While it is preferred to use a roller for transmitting thrust between seat 19 and lever 34 as shown at 27, it is to be understood that under some conditions a lever 28 corresponding with lever 24 can be connected by a link 29 to the seat 19' at a point indicated at 30. The operation of this modified structure would be practically the same as that heretofore described except that instead of the roller 27 traveling along the bottom surface of the seat, a thrust will be transmitted through the link 29 and the hinge connections at its ends.

What is claimed is:

1. A vehicle of the class described including a crank axle, wheels supporting the same, a frame mounted at one end on the axle, a steering head connected to the other end of the frame, a pedal lever fulcrumed in and extending below the frame, a seat hingedly mounted at its front end upon the frame, a pitman connection between the back portion of the seat and the crank axle for transmitting a down thrust from the seat to the axle, and means between the lever and the seat for transmitting an upward thrust from said lever to the seat.

2. A vehicle of the class described including a frame, a steering head at one end thereof, a crank axle journalled in the other end of the frame, wheels supporting said axle, a driving connection between the axle and one of the wheels, a seat hingedly connected at its front end to the frame, a pitman connection between the seat and the crank axle, a lever fulcrumed in the frame, a foot pedal at the lower end thereof, and a roller for transmitting thrust between the upper end of the lever and the seat.

3. A vehicle of the class described including a frame, a steering head at one end thereof, a crank axle journalled in the other end of the frame, wheels supporting the axle, one of said wheels having a notched hub, a coupling pin extending through the axle and resting within the notched hub to couple the wheel to the axle for rotation therewith, a seat hingedly connected to the front end of the frame, said seat and frame diverging rearwardly, a pedal lever journalled within the frame at a point between the ends of the lever, a foot pedal at the lower end of the lever, means for transmitting upward thrust to said seat from the lever, and a pitman connecting the seat to the crank axle for transmitting downward thrust from said seat to the crank on the axle.

4. A vehicle of the class described including a crank axle, wheels supporting the same, a frame mounted at one end of the axle, a steering head connected to the other end of the frame, a pedal lever fulcrumed in and extending below the frame, a seat hingedly mounted at its front end upon the frame, a pitman connection between the back portion of the seat and the crank axle for transmitting a down thrust from the seat to the axle, and means between the lever and the seat for transmitting an upward thrust from said lever to the seat, said means comprising a roller on the lever having rolling contact with the bottom of the seat.

5. A vehicle of the class described including a crank axle, wheels supporting the same, a frame mounted at one end of the axle, a steering head connected to the other end of the frame, a pedal lever fulcrumed in and extending below the frame, a seat hingedly mounted at its front end upon the frame, a pitman connection between the back portion of the seat and the crank axle for transmitting a down thrust from the seat to the axle, and a pitman connection between the lever and the seat for transmitting an upward thrust from said lever to the seat.

SEMAN URYTZKY.